Figure 3:
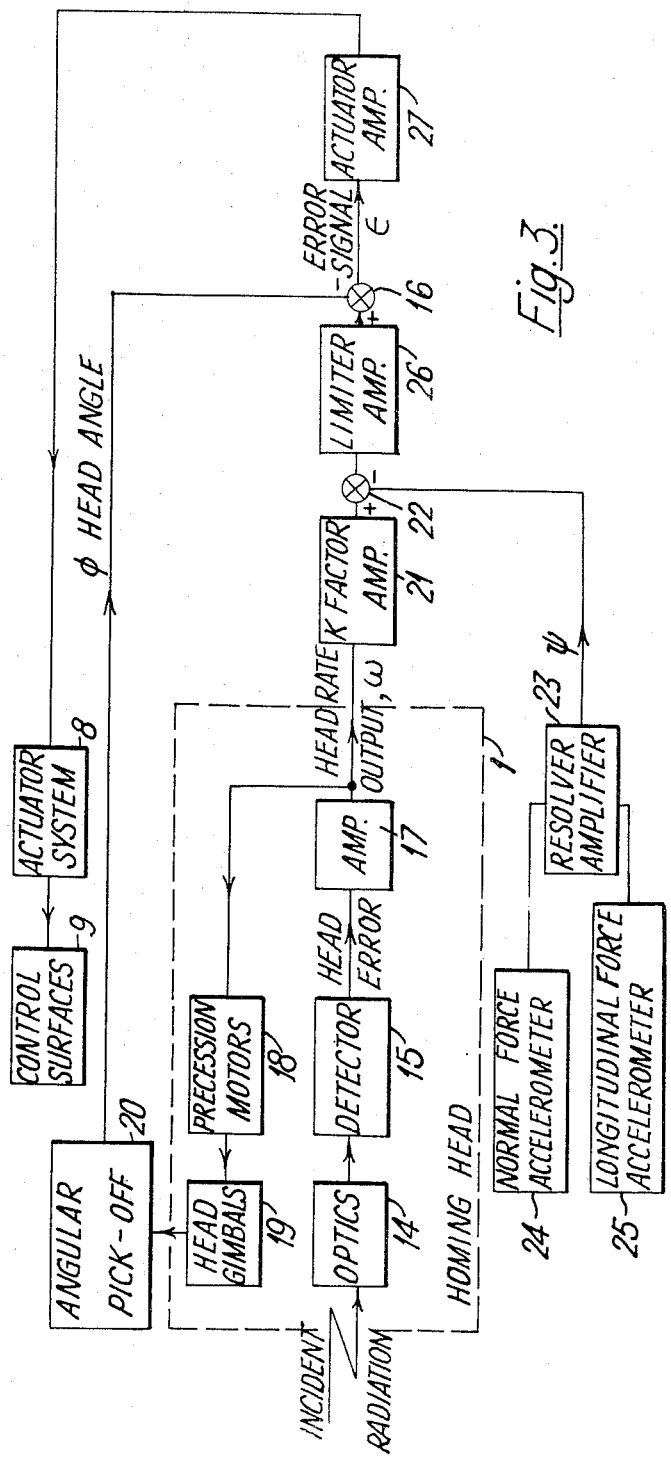

United States Patent [19]
Leek

[11] 4,318,515
[45] Mar. 9, 1982

[54] GUIDANCE SYSTEMS

[76] Inventor: Stanley Leek, 8 Sunnyfield, The Ryde, Hatfield, Hertfordshire, England

[21] Appl. No.: 760,395

[22] Filed: Sep. 11, 1968

[30] Foreign Application Priority Data

Sep. 11, 1967 [GB] United Kingdom ............... 41447/67

[51] Int. Cl.³ .............................................. F41G 7/26
[52] U.S. Cl. ................................................. 244/3.16
[58] Field of Search ......................................... 244/3.16

[56] References Cited

U.S. PATENT DOCUMENTS 2,826,380 3/1958 Ketchledge .................... 244/3.16 X

*Primary Examiner*—Charles T. Jordan
*Attorney, Agent, or Firm*—Dowell & Dowell

[57] ABSTRACT

In an aerial or space missile guidance system, the direction of the resultant applied force vector relative to the line of sight from the missile to the target is controlled by measuring the rate of turn of the line of sight and turning the missile frame appropriately until the resultant force vector points in a direction to reduce any error in the missile flight path. A signal representing rate of turn of the line of sight is derived, amplified by a predetermined multiplication factor, and then algebraically summed with a second signal representing the angle between the resultant force vector and the longitudinal axis of the missile. The result of this first summation is then algebraically summed with a third signal representing the angle between the missile longitudinal axis and the target line of sight to obtain an error signal for application to the missile control actuation system.

11 Claims, 5 Drawing Figures

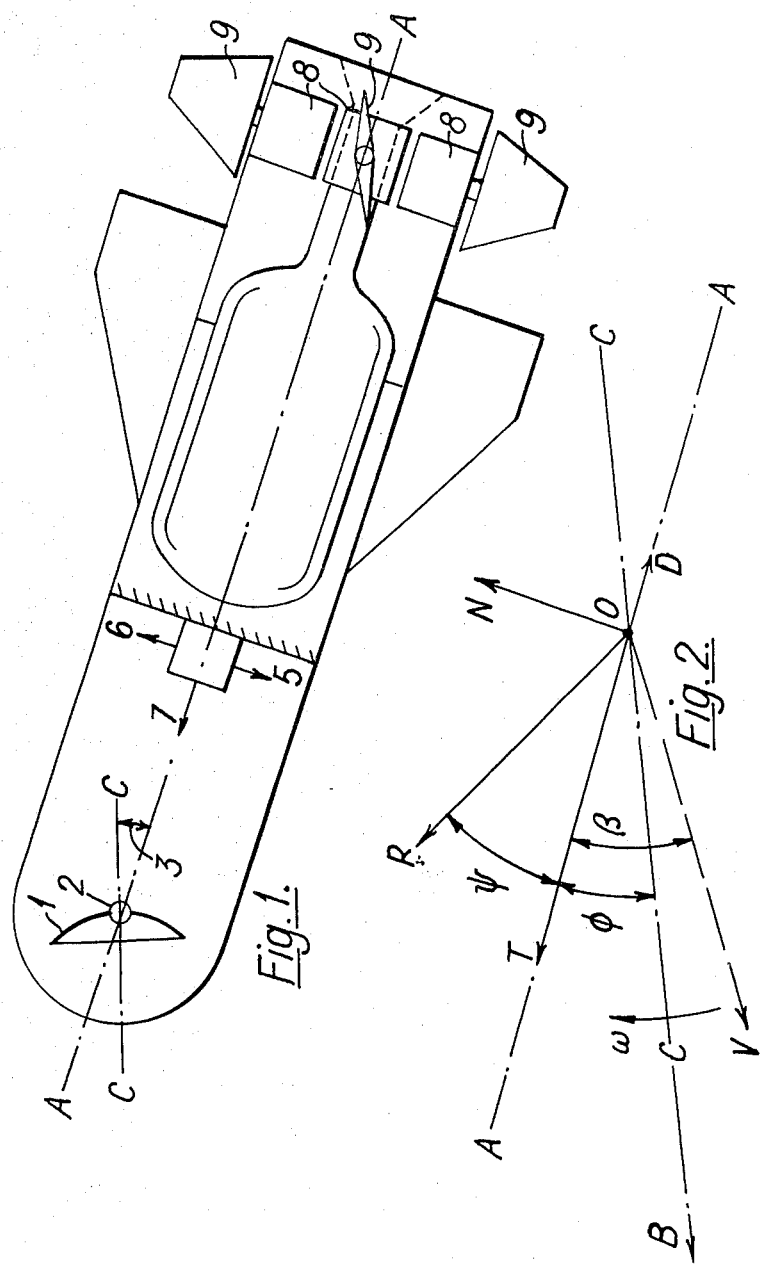

GUIDANCE SYSTEMS

This invention relates to a method and apparatus for steering an aerial or space vehicle, such as a missile, towards a target, and more particularly to a control system wherein the resultant vehicle acceleration is controlled relative to apparent target motion.

In a missile which is propelled continuously, the motor thrust may be utilised as a major contribution to the total forces available for changing the missile flight path. Aerodynamic forces may still contribute a significant amount to the total forces acting on the missile, however, and it is an object of the present invention to provide a means of controlling the direction of motor thrust and aerodynamic forces in steering the missile.

The control system is applicable to a missile in which the motor thrust is greater than the component of missile drag acting along the missile longitudinal axis. The resultant applied force vector is thus directed forward along the missile longitudinal axis or displaced from it by an angle which depends on the magnitude of any aerodynamic force acting normal to the longitudinal axis.

According to the invention, to steer an aerial or space vehicle such as a missile, the direction of the resultant applied force vector relative to the line of sight between missile and target is controlled by measuring the rate of turn of the line of sight and turning the missile frame appropriately until the resultant force vector points in a direction to reduce any error in the missile flight path.

The apparatus for performing the invention includes a target detector, which may for example comprise an optical-infra-red cell homing head, which senses the direction of the target relative to the longitudinal axis of the missile frame and the rate of turn of the line of sight between missile and target. There are also provided means, such as an accelerometer or set of accelerometers and associated apparatus, which indicate the angular displacement of the resultant force vector acting on the missile from the forward longitudinal axis of the missile. The apparatus further includes a system of pitch and yaw control actuators, operating either a set of aerodynamic control surfaces or means for deflecting the propulsive jet of the missile thrust motor, in order to turn the missile frame. Means is provided for adding, mechanically or electrically, the output of the homing head representing displacement of the target direction from the missile longitudinal axis to the output of the accelerometers representing displacement of the resultant force vector from the missile longitudinal axis. The sum of these two outputs is compared with a signal which is dependent on the output from the detector head representing the rate of turn of the line of sight so as to produce an error output which is fed into the pitch and yaw control actuator system that turns the missile frame to minimise the error output.

Figure 4:
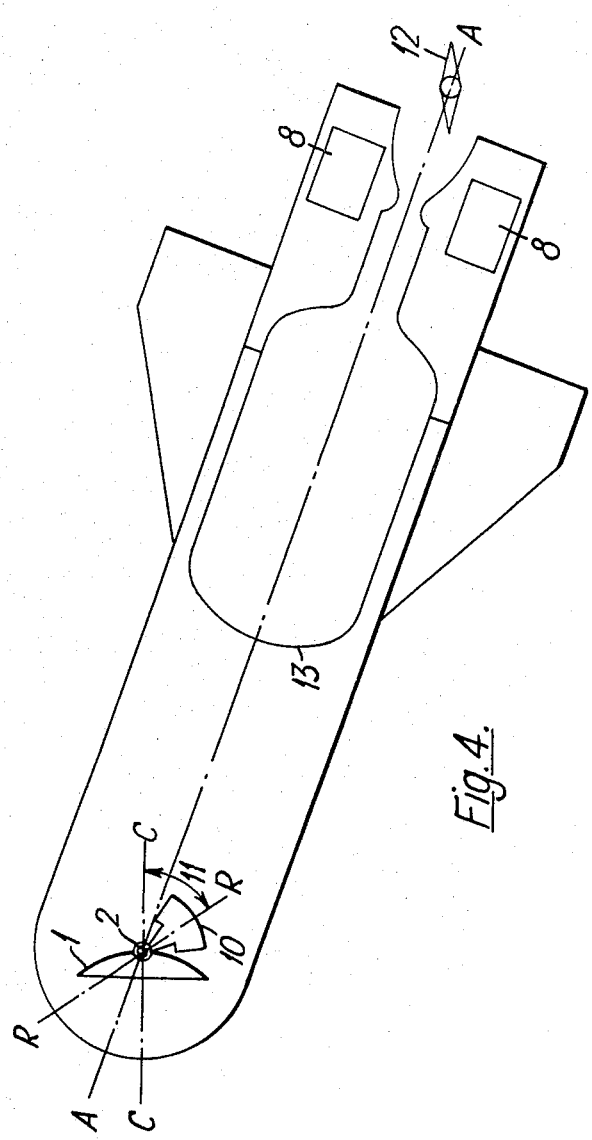
Figure 5:
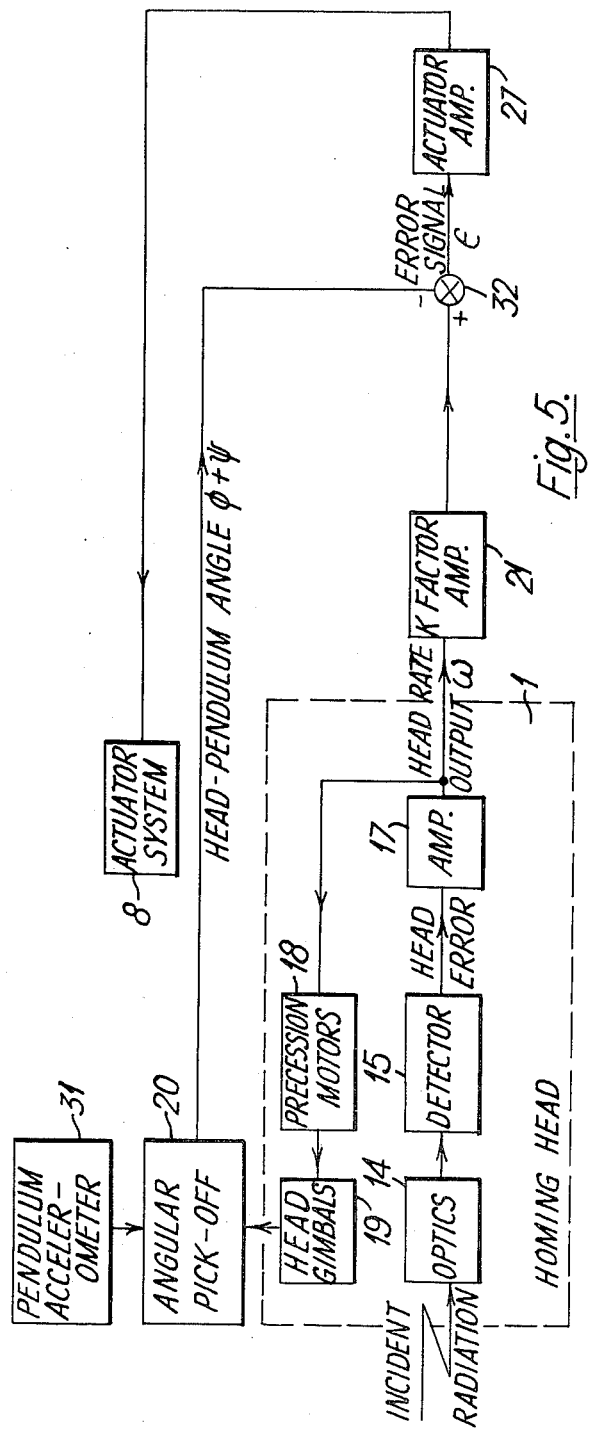

Apparatus for carrying the invention into effect will now be described by way of example, with reference to the appended drawings, in which:

FIG. 1 is a schematic diagram of a missile utilising a form of the control system described herein, FIG. 2 is a vector diagram illustrating the forces and axes in two dimensions, FIG. 3 is a block diagram illustrating the principle of operation for the missile application described in FIG. 1, FIG. 4 is a schematic diagram of a missile utilising an alternative form of the control system described herein, and FIG. 5 is a block diagram illustrating the principle of operation for the missile application described in FIG. 4.

The missile shown in FIG. 1 utilises a homing head with an appropriate optical arrangement which is not described in detail but is represented by the collector dish, 1, pivoted at a point 2. The operation is shown, and will be described, in one plane only but there is provision for similar operation in an orthogonal plane which includes the longitudinal axis of the missile, A—A. The detector head is provided with a pick-off instrument which measures the angle 3 between the optical axis C—C and the longitudinal axis A—A. It is also provided with instruments for measuring the rate of turn of the line of sight between missile and target. This would typically consist of a gyrosocopically stabilised optical detector system and a set of precession motors to turn the head in response to the measured angular error between the head axis C—C and the target direction. The mean level of the signal to drive the precession motors would then be used to represent the rate of turn of the line of sight. Other commonly known arrangements for measuring line of sight rate of turn could be used instead. An acceleration sensitive instrument, or instruments, 4 measures the external applied force components acting in the lateral and longitudinal directions 5, 6 and 7 and suitable apparatus is provided for determining the angle between the resultant force vector and the longitudinal axis of the missile.

FIG. 2 shows, in one plane only, a typical situation of the forces acting on the missile and their directions, and the directions of the target and missile axes. OR, at an angle $\psi$ to the longitudinal axis A—A of the missile, is the resultant force vector due to the motor thrust OT, the aerodynamic force ON normal to the missile axis, and the aerodynamic drag OD acting along the missile axis. The aerodynamic forces result from the missile velocity OV in a direction at an angle $\beta$ to the axis A—A. The homing head optical axis C—C is directed at an angle $\phi$ to the axis A—A and has a rate of turn $\omega$ corresponding to the missile-target line of sight rate of turn. The direction of the target is shown by the line OB.

The rate of turn of the line of sight, or the homing head rate of turn, $\omega$ is determined from the procession motor drive signal referred to above, or other suitable instruments, and the signal is amplified by an amount K and compared with the signal from the accelerometers representing the angle $\psi$. The combined signal representing the sum of these two quantities is then compared with the head angle measurement $\phi$, and the resulting difference, or error, signal is used to drive the actuators 8 and control surfaces 9 in FIG. 1. The actuator system is arranged to turn the missile frame by means of the control surfaces so that the error signal above is minimised. Any commonly used missile control actuation system may be employed for this purpose. The overall control system is thus arranged to provide a method of missile navigation which is approximately represented by the equation, $$\phi + \psi = K\omega \qquad (1)$$

and this is achieved as described above by minimising an error signal $\epsilon$, $$\epsilon = (K\omega - \psi) - \phi \quad (2)$$

The quantities in the equations above represent the signals, electrical or mechanical, measured by the instruments aforementioned, and are further illustrated in FIG. 3, which shows the flow of signals for a typical application similar to that described in FIG. 1. The form of equation (2) above is arranged so that the signal represented by $(K\omega - \psi)$ may be limited in its maximum value in order that the head angle, $\phi$, shall not exceed some desired value.

In FIG. 3 the incident radiation from the target is focussed by the optical system 14 on to the detector 15 within the homing head 1. The error signal representing departure of the head viewing direction from the actual direction of the target is amplified at 17 and applied to drive the precession motors 18 which are coupled to the head gimbals 19 for redirecting the head in appropriate manner to reduce the head direction error signal toward zero. An angular pick-off 20 derives the head angle $\phi$ from the head gimbals. The signal applied to the precession motors is also picked-off to provide the head angular rate output $\omega$.

The signal $\omega$ is amplified at 21 by the factor K and then summed at 22 with a signal representing the angle $\psi$ which is derived from a resolver amplifier 23 receiving inputs from accelerometers 24, 25 responsive, respectively, to forces normal to and along the longitudinal axis of the missile. The summed output is applied via a limiter amplifier 26 to be algebraically summed further at 16 with the head angle signal $\phi$ and the result is employed to adjust the flight path of the missile via a driver amplifier 27, the actuator system 8 and the control surfaces 9.

FIG. 4 shows an alternative arrangement in which the acceleration-sensitive element consists of a pendulum 10, pivoted at the same point 2 as the homing head and provided with an angular pick-off which directly measures the angle 11 between the optical axis C—C and the direction of the resultant force vector OR, so producing a signal which represents the quantity $\phi + \psi$ as shown in FIG. 2. FIG. 5 shows the signal flow diagram corresponding to the scheme of FIG. 4. An alternative form of control actuation is illustrated schematically in FIG. 4, in which the control actuators 8 drive movable vanes 12 placed in the propulsive jet efflux of the motor 13 so that a pitching or yawing moment is imparted to the missile frame when the vanes are deflected. Any other means of deflecting the propulsive jet to provide a pitching or yawing moment may be employed instead.

In FIG. 5, the output of the K factor amplifier 21 is shown algebraically summed at 32 with a signal representing $\phi + \psi$ derived from the angular pick-off 20 which now has coupled to it the pendulum accelerometer 31. The resultant is applied to the actuator system driver amplifier 27 as before.

I claim:

1. Apparatus for steering an aerial or space vehicle such as a missile, comprising means for deriving a first signal proportional to the rate of turn of the line of sight between the missile and a target, means for deriving a second signal proportional to the displacement angle between said line of sight and the missile longitudinal axis, means for deriving a third signal proportional to the angle between the longitudinal axis of the missile and the vector of the resultant of the forces acting thereon, and means for algebraically summing these three signals to obtain an error signal which is applied to control means for adjusting the flight path of the missile in a direction such as to reduce said error signal.

2. Apparatus according to claim 1, wherein the means for deriving the first and second signals comprise a target detector having a pivotally-mounted homing head that turns toward the target.

3. Apparatus according to claim 2, wherein the homing head includes an infra-red sensitive detector cell and an associated optical system.

4. Apparatus according to claim 2, wherein the homing head is automatically turned toward the target by drive means responsive to a drive signal representing error between the missile/target line of sight and the orientation of the homing head, said first signal proportional to the rate of turn of said line of sight is derived from said drive signal and said second signal is derived from an angular pick-off device which detects the angular position of the homing head relative to the missile frame.

5. Apparatus according to claim 1, wherein the means for deriving said third signal comprise accelerometer devices and an angle resolver.

6. Apparatus according to claim 4, wherein the means for deriving said third signal comprises an accelerometer device which is coupled to the angular pick-off device, whereby the combination of the accelerometer and angular pick-off delivers an output signal proportional to the sum of the second and third signals.

7. Apparatus according to claim 1, wherein said means for algebraically summing said three signals comprises first summing means algebraically summing said first and third signals, after said first signal has been amplified to introduce into it a selected fixed multiplication factor, and second summing means algebraically summing the signal output of said first summing means and said second signal.

8. Apparatus according to claim 7, further comprising a signal limiter through which said signal output of said first summing means passes before it is applied to said second summing means.

9. A method of steering an aerial or space vehicle such as a missile, wherein the direction of the resultant applied force vector relative to the line of sight between missile and target is controlled by measuring the rate of turn of the line of sight and turning the missile frame appropriately until the resultant force vector points in a direction to reduce any error in the missile flight path, and comprising the steps of deriving signal quantities proportional, respectively, to said rate of turn, the angle between the longitudinal axis of the missile and the resultant applied force vector, and the angle between the longitudinal axis of the missile and said line of sight, and combining said derived signal quantities algebraically to obtain an error signal for driving actuators that exercise directional control on the missile thereby to minimise said error signal.

10. A method according to claim 9, wherein said derived signal quantity representing rate of turn is first multiplied by a fixed multiplication factor and then algebraically summed in a first summation step with said derived signal quantity representing the angle between the longitudinal axis of the missile and the resultant applied force vector, and the signal resulting from this first summation is then algebraically summed in a second summation step with said derived signal quantity representing the angle between the longitudinal axis of the missile and said line of sight.

11. A method according to claim 10, wherein said signal resulting from said first summation step is subjected to a signal-limiting operation before passing to said second summation step.

* * * * *